UNITED STATES PATENT OFFICE.

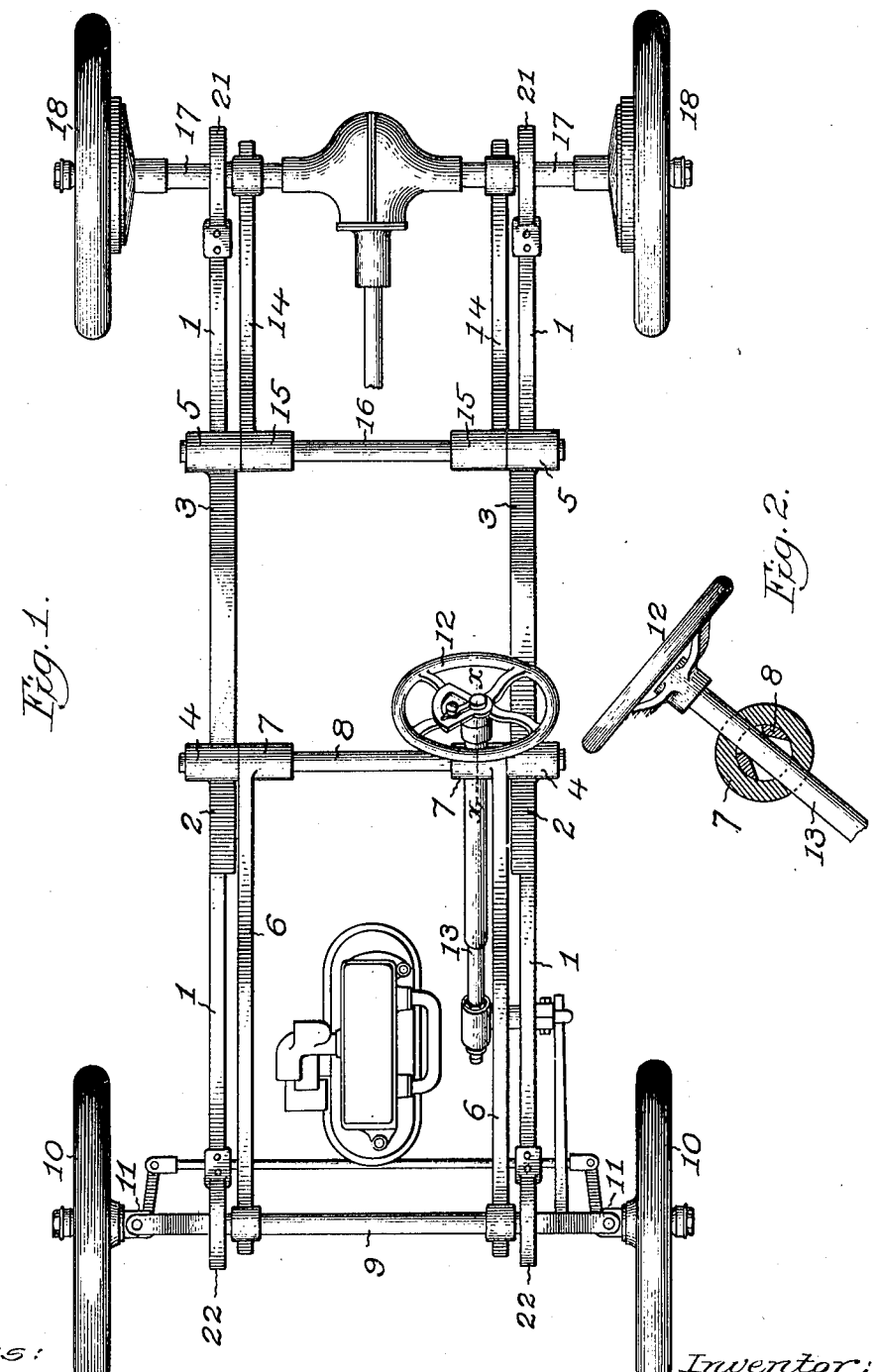

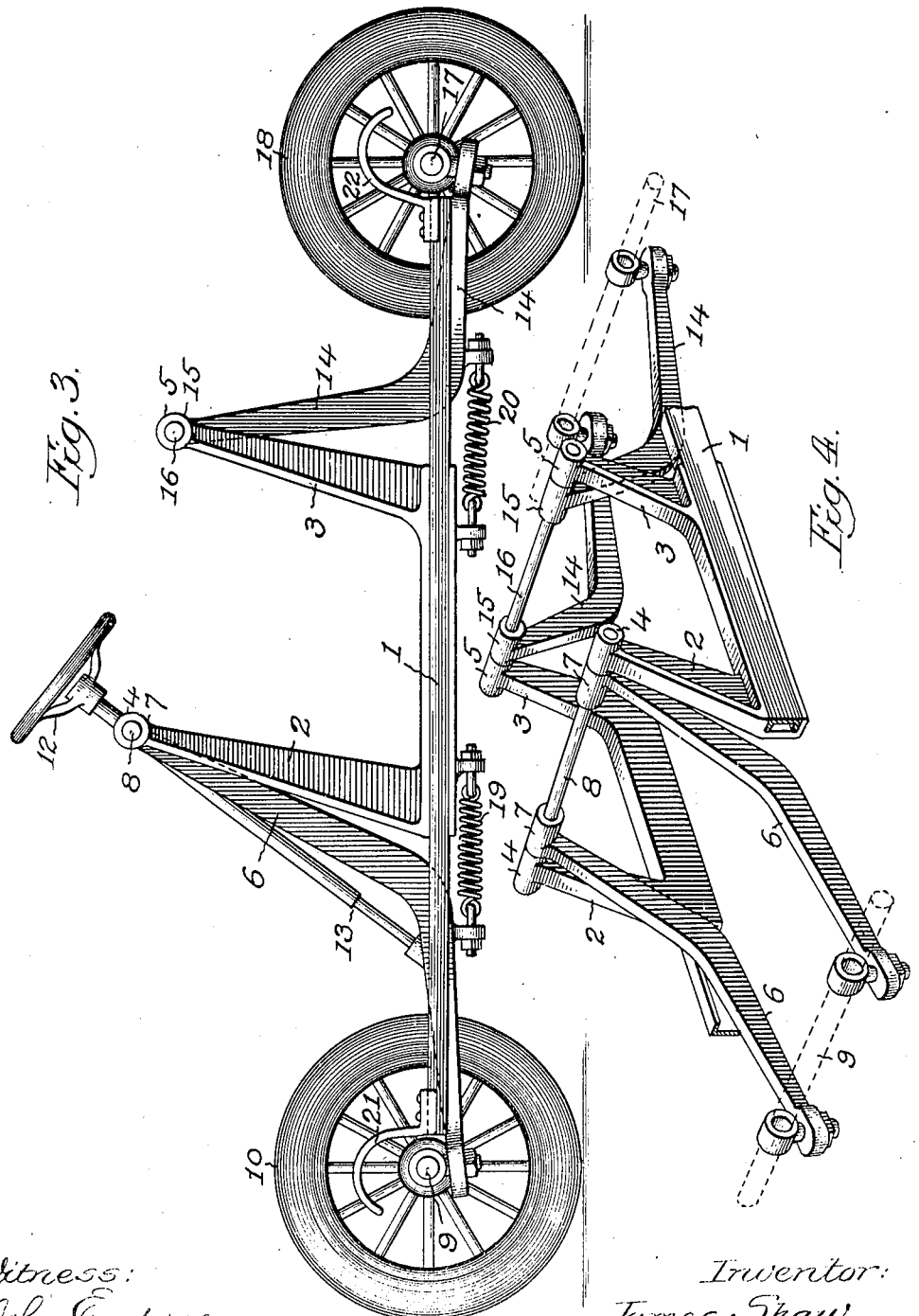

JAMES SHAW, OF CHICAGO, ILLINOIS.

MOTOR-VEHICLE CHASSIS.

1,292,102.     Specification of Letters Patent.     Patented Jan. 21, 1919.

Application filed May 10, 1918. Serial No. 233,818.

*To all whom it may concern:*

Be it known that I, JAMES SHAW, a citizen of the United States of America, and a resident of Chicago, in the county of Cook, State of Illinois, have invented certain new and useful Improvements in Motor-Vehicle Chassis, of which the following is a specification.

This invention relates to the running gear or chassis of motor vehicles, and has for its object to provide a simple and efficient structural formation and combination of parts, whereby the wheels are connected to the frame in a manner combining strength with ample resiliency, all as will hereinafter more fully appear.

In the accompanying drawings:—

Figure 1, is a plan view illustrating the preferred arrangement of parts in the present improvement.

Fig. 2, is an enlarged detail section on line x—x, Fig. 1.

Fig. 3, is a side elevation.

Fig. 4, is a detail perspective view illustrating the arrangement and pivotal connection of the parts.

Similar reference numerals indicate like parts in the several views.

Referring to the drawings, 1 designates the main frame of the chassis or running gear, of any usual and suitable form, and adapted to support the body and other usual accessories of the vehicle.

2 and 3 designate uprights or standards connected fixedly and in any usual manner to the main frame 1, adjacent to the respective front and rear ends of the same and having pivot eyes, 4 and 5, at their upper ends as shown.

6 designates the forward angularly formed sub-frame of the present structure, associated with the forward end of the main frame 1, and with its approximately upright rear arms provided with pivot eyes 7 adapted for pivotal connection with the pivot eyes 4 of the forward standard 2, aforesaid, by a transverse pivot shaft or pintle 8. The other approximately horizontal arms of the sub-frame 6, extend forwardly of the main frame 1, and carry the axle member 9 of the pair of front and steering wheels 10, which are connected to said axle member by the usual intermediate steering knuckles 11, as shown in Fig. 1.

12 designates the steering wheel, the stem 13 of which is journaled in the forward sub-frame 6, with its lower end operatively connected by any usual means with the aforesaid steering knuckles 11, of the front wheels 10 of the vehicle.

14 designates the rearward angularly formed sub-frame of the present structure, associated with the rear end of the main frame 1, with its approximately upright forward arms provided with pivot eyes 15 adapted for pivotal connection with the pivot eyes 5 of the rear standard 3, aforesaid, by a transverse pivot shaft or pintle 16. The other and approximately horizontal arms of the sub-frame 15 extend rearwardly of the main frame 1, and carry the axle member 17, with which the pair of rear and driving wheels 18 are associated in any usual and well known manner.

19 and 20 designate tension springs of any usual and suitable type connected at one end to the main frame, 1, and at the other end to one or the other of the sub-frames 6 and 14, and adapted to resist in a resilient manner, a tendency of the wheels to move upwardly in actual use and due to roughness and irregularities in the roadway.

21 and 22 designate hook shape bracket members fixedly attached to the front and rear portions of the main frame 1, and in adjacent relation to the front and rear axle members 9 and 18 aforesaid, and adapted to provide stops or abutments to limit the independent upward movement of the said axle members and their accessories in actual rise upon rough and uneven roadways.

Having thus fully described my said invention, what I claim as new and desire to secure by Letters Patent, is:—

1. In a motor vehicle chassis, the combination of a main frame provided with a pivot standard, a sub-frame of an angular form pivoted at one end to said pivot standard, the respective portions of the sub-frame having an approximately vertical and horizontal arrangement, a tension spring forming a resilient connection between said frames, and attached at one end to the main frame and at the other end to the sub-frame adjacent to its intermediate angular portion, and an axle member carrying a pair of wheels and attached to the horizontal portion of said sub-frame, substantially as set forth.

2. In a motor vehicle chassis, the combination of a main frame provided with a pivot standard, a sub-frame of an angular form pivoted at one end to said pivot standard, the respective portions of the sub-frame having an approximately vertical and horizontal arrangement, a tension spring forming a resilient connection between said frames, and attached at one end to the main frame and at the other end to the sub-frame adjacent to its intermediate angular portion, and an axle member carrying a pair of wheels and attached to the horizontal portion of said sub-frame, the main frame having a hook-shaped bracket arranged adjacent to said axle member and adapted to limit the independent upward movement of the same, substantially as set forth.

3. In a motor vehicle chassis, the combination of a main frame provided with a pivot standard at front, a forwardly disposed sub-frame of an angular form pivoted at one end to said pivotal standard, the respective portions of the sub-frame having an approximately vertical and horizontal arrangement, a tension spring forming a resilient connection between said frames, and attached at one end to the main frame and at the other end to the sub-frame adjacent to its intermediate angular portion, a forward axle member attached to the horizontal portion of said sub-frame, and a pair of steering wheels connected to said axle member by pivot knuckles, substantially as set forth.

4. In a motor vehicle chassis, the combination of a main frame provided with a pivot standard at front, a forwardly disposed sub-frame of an angular form pivoted at one end to said pivot standard, the respective portions of the sub-frame having an approximately vertical and horizontal arrangement, a tension spring forming a resilient connection between said frames, and attached at one end to the main frame and at the other end to the sub-frame adjacent to its intermediate angular portion, a forward axle member attached to the horizontal portion of said sub-frame, a pair of steering wheels connected to said axle member by pivot knuckles, and a steering wheel mounted on said sub-frame and having operative connections with said knuckles, substantially as set forth.

Signed at Chicago, Illinois this 6th day of May 1918.

JAMES SHAW.